US011348432B2

(12) United States Patent
Leurs et al.

(10) Patent No.: US 11,348,432 B2
(45) Date of Patent: May 31, 2022

(54) WRIST-WORN EMERGENCY DETECTION DEVICE

(71) Applicant: KONINKLIJKE PHILIPS N.V., Eindhoven (NL)

(72) Inventors: Nathalie Dorothee Pieternel Leurs, Geldrop (NL); Warner Rudolph Theophile Ten Kate, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/312,978

(22) PCT Filed: Dec. 10, 2019

(86) PCT No.: PCT/EP2019/084297
§ 371 (c)(1),
(2) Date: Jun. 11, 2021

(87) PCT Pub. No.: WO2020/120422
PCT Pub. Date: Jun. 18, 2020

(65) Prior Publication Data
US 2022/0044539 A1 Feb. 10, 2022

(30) Foreign Application Priority Data

Dec. 14, 2018 (EP) .................................... 18212551

(51) Int. Cl.
*G08B 21/00* (2006.01)
*G08B 21/04* (2006.01)
(Continued)

(52) U.S. Cl.
CPC ......... *G08B 21/043* (2013.01); *G06F 3/0488* (2013.01); *G08B 21/0446* (2013.01); *G08B 25/001* (2013.01)

(58) Field of Classification Search
CPC .. G08B 21/43; G08B 21/0446; G08B 25/001; G06F 3/0488
See application file for complete search history.

(56) References Cited

U.S. PATENT DOCUMENTS

| 9,717,101 | B1* | 7/2017 | Burnham | H04W 76/50 |
| 2004/0172222 | A1* | 9/2004 | Simpson | A61B 5/7405 |
| | | | | 702/189 |

(Continued)

FOREIGN PATENT DOCUMENTS

CN 204731935 U 10/2015

OTHER PUBLICATIONS

International Search Report and Written Opinion, International Application No. PCT/EP2019/084297, dated Feb. 12, 2020.

*Primary Examiner* — Ojiako K Nwugo

(57) ABSTRACT

According to an aspect, there is provided a wrist-worn emergency-detection device (10), such as a fall-detection device, the emergency detection device comprising a sensor interface (30), a processor (20) and a touch-sensitive display (40), wherein the processor is arranged to: trigger an alarm based on an emergency-detection input from the sensor interface; select a cancel configuration of the device to accept a cancel alarm input from a user, the cancel alarm input instructing alarm cancellation with an input that varies from a previous time a cancel configuration was selected; format the display with user instructions according to the cancel configuration; and cancel the alarm when there is a cancel alarm input by the user in accordance with the user instructions.

15 Claims, 14 Drawing Sheets

(51) Int. Cl.
  *G06F 3/0488* (2022.01)
  *G08B 25/00* (2006.01)

(56) References Cited

U.S. PATENT DOCUMENTS

| | | |
|---|---|---|
| 2009/0128320 A1 | 5/2009 | Needham et al. |
| 2013/0250080 A1* | 9/2013 | Farrell ............... G08B 21/0283 |
| | | 348/77 |
| 2014/0062702 A1 | 3/2014 | Rubio et al. |
| 2015/0002293 A1 | 1/2015 | Nepo |
| 2015/0145662 A1 | 5/2015 | Barfield et al. |
| 2015/0185161 A1* | 7/2015 | Gettings ................. G01J 5/025 |
| | | 73/865.8 |
| 2015/0302728 A1* | 10/2015 | Gettings .................. G08B 3/10 |
| | | 340/506 |
| 2017/0116845 A1* | 4/2017 | See ...................... G08B 25/016 |
| 2017/0358191 A1 | 12/2017 | Kechichian |
| 2019/0066481 A1* | 2/2019 | Brown .................. G08B 17/10 |

* cited by examiner

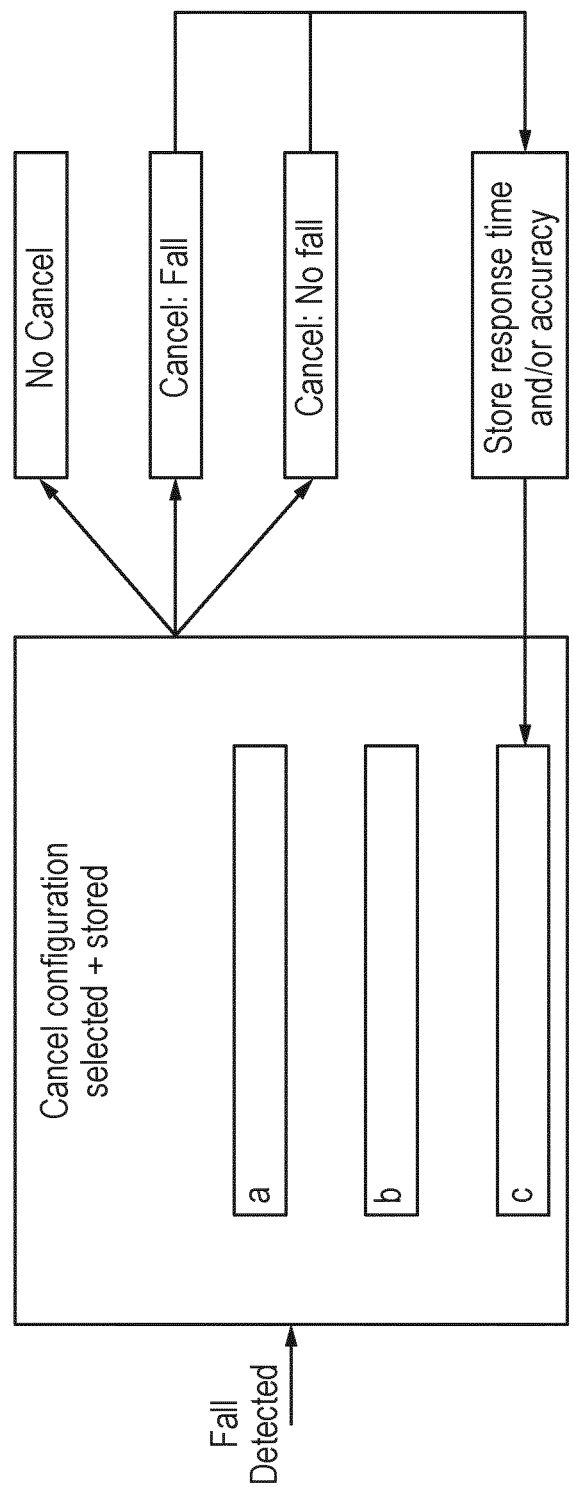

WRIST-WORN EMERGENCY DETECTION DEVICE

CROSS-REFERENCE TO PRIOR APPLICATIONS

This application is the U.S. National Phase application under 35 U.S.C. § 371 of International Application No. PCT/EP2019/084297, filed on 12 Oct. 2019, which claims the benefit of European Patent Application No. 18212551.8, filed on 14 Dec. 2018. These applications are hereby incorporated by reference herein.

FIELD OF THE INVENTION

The invention relates to wrist-worn devices that detect emergencies, for example personal emergencies such as medical emergencies.

BACKGROUND OF THE INVENTION

With ageing, physical ability declines. A person's mobility may be affected and they may experience difficulty in maintaining their independence. Potential emergencies include, for example, falls, dangerously high or low pulse rates or blood pressure, (upcoming) COPD exacerbations, epileptic seizures and low oxygen saturation in the blood. In one specific example of an emergency, a large category of difficulties concern falls, which may have a dramatic outcome on the health state of the person falling.

Falls affect millions of people each year and result in significant injuries, particularly among the elderly. In fact, it has been estimated that falls are one of the top three causes of death in elderly people. A fall is defined as a sudden, uncontrolled and unintentional downward displacement of the body to the ground, followed by an impact, after which the body stays down on the ground.

A personal emergency response system (PERS) is a system in which help for a subject can be requested. Typically, the PERS includes a Personal Help Button (PHB) that the user carries with them. By pressing that button help is summoned. If the subject suffers a severe fall (for example by which they get confused or even worse if they are knocked unconscious), the subject might be unable to push the button, which might mean that help does not arrive for a significant period of time, particularly if the subject lives alone. The consequences of a fall can become more severe if the subject stays lying for a long time.

Thus the PERS can include one or more sensors, for example an (3D) accelerometer, gyroscope, magnetometer, and an air pressure sensor (for measuring the height, height change or absolute altitude). Other type of sensors include those measuring vital signs, such as pulse (via Photoplethysmography (PPG)) and skin conductivity. Typically, the sensors are hosted in the PHB, but they may also reside elsewhere, for example in a (accompanying) mobile phone, in a hearing aid, or in a device to assist the walking (canes and walkers). The output of the sensors can be processed to determine if the subject has suffered a fall. This processing can involve inferring the occurrence of a fall by processing the time series generated by the accelerometer and air pressure sensor, for example. In general, a fall detection algorithm tests on one or more features such as, but not limited to, impact, orientation, orientation change, height change, and vertical velocity. Reliable fall detection results when the set of computed values for these features is different for falls than for other movements that are not a fall. On detecting a fall, an alarm is triggered by the PERS without the subject having to press the button.

Automatic fall detection solutions may also raise false alarms, leading to unnecessary calls. Effort is being put into providing robust classification methods or processing algorithms for detecting falls accurately, since, clearly, it is important to correctly identify a fall by the subject so that assistance can be provided, and the occurrence of false alarms (or false positives) should be minimised (or even prevented altogether).

One improvement is to enable the PERS with a cancel button that enables the user to revoke the alarm before a call for help is sent out. The cancel button can also be used to revoke an alarm in case of an actual fall, if the user does not need or does not want assistance. US 2014062702 A1 discloses the use of a touchscreen for cancelling a fall detector event.

SUMMARY OF THE INVENTION

When designing algorithms for Automatic Fall Detectors, one has to trade-off the number of FP (False Positives, in user terminology 'false alarms'; the device detects a fall but user did not fall) to the number of False Negative (FN, in user terms 'missed falls'; user fell but device did not detect it). The more sensitive the algorithm, the more falls True Positives (TP) are detected, and hence the less falls are missed (FN), but also the more false alarms (FP) it generates. The algorithms applied today are designed in such a way that they maintain the False Positive Rate FPR at a manageable level from a user/cost perspective while keeping the True Positive Rate TPR as high as possible.

In particular, solutions where the fall detector is being worn at the wrist may suffer from high false alarm rates. Users will accept having to cancel a limited number of false alarms, if this results in detecting a higher percentage of real falls. Users must be able to cancel an alarm, because users will then accept a higher FPR and hence the TPR will be higher as well.

It is commonly known in the home care provider domain that a significant proportion of the users of an alarm button (without automatic fall detection) chooses not to press the alarm button after a fall, because they do not want to get help via the call centre/service provider. Two often mentioned reasons are: they believe they can get up themselves, or they prefer to wait for local help (e.g. because they know a care provider will visit them soon). To offer users a similar choice ("do I want to be contacted by call centre or not") when using an automatic fall detector a "cancel alarm" function (aka "no help needed" function) may be provided in the device/application.

The inventors have come to the realisation that some users may have to cancel an alarm rather often, for example once per day or once per week. Implicitly this user will be trained to cancel a false alarm as soon as he/she notices the fall-detected-signal (for example a sound and/or vibration of the wrist device). It may happen that as soon as a user notices the fall-detected-signal, he/she executes the cancel action automatically; it has become an automatic response to the signal. The user does not make a conscious decision to cancel the alarm, and may not become aware of this neither. As a result, after a true fall, the user may cancel the alarm unintendedly, but may still be expecting help to arrive soon.

Therefore, there is a need for a way of avoiding, or at least mitigating, such unintentional cancellation.

According to a first specific aspect, there is provided a wrist-worn emergency detection device, such as a fall-detection device, the emergency detection device comprising a sensor interface, a processor and a touch-sensitive display, wherein the processor is arranged to: trigger an alarm based on an emergency-detection input from the sensor interface; select a cancel configuration of the device to accept a cancel alarm input from a user, the cancel alarm input instructing alarm cancellation with an input that varies from a previous time a cancel configuration was selected; format the display with user instructions according to the cancel configuration; and cancel the alarm when there is a cancel alarm input by the user in accordance with the user instructions. Thus the first aspect reduces false alarm rates by requiring the user to pay attention to the cancel action. This provides a more effective and accurate machine-human interaction.

The emergency detection device may be a fall-detection device and may additionally or alternatively be a detection device for other emergencies, such as dangerously high or low pulse rates or blood pressure, (upcoming) COPD exacerbations, epileptic seizures and low oxygen saturation in the blood)

In some embodiments, the input variation is in one or more of: a sequence of inputs; an input position on the display; a swipe movement; a hand movement, a voice control and a period of activation time. All of these variations can be sufficient to avoid automatic cancellation by the user, because the user is required to pay attention to the cancel action.

In some embodiments, the processor is arranged to select between different available configuration types to vary the input, wherein each different configuration type has a different display format template and requires a different cancel alarm input. For instance, different display format templates can have different screen elements (such as any of different buttons, graphics texts, colours, positions of texts) requiring a different type of user input for cancellation (press, long press, swipe, voice control, hand gesture, two-component or two-stage input, etc.). The different display format templates, and in particular a change to a new display format can alert the user to pay attention.

In some embodiments, the processor is arranged to configure the device with a cancel configuration that differs from a predefined number of most recent configurations. For example, the cancel configuration can differ from the most recent configuration, or from the most recent 2-5 configurations.

In some embodiments, the processor is arranged to provide a cancel configuration with a more challenging cancel configuration, for example a shorter required response time when the chances (probability or likelihood) of a real emergency are higher. Hence the more likely a true event, the more challenging the cancel configuration.

In some embodiments, the processor is arranged to trigger the alarm if a threshold value of an emergency-detection algorithm based on the input from the sensor is exceeded; and provide a cancel configuration having a shorter response time when the threshold value is exceeded by a greater margin and to provide a cancel configuration having a longer response time when the threshold value is exceeded by a smaller margin. The length of response time may be generally determined or determined for a specific user, for example by monitoring response times on the device.

The margin is a way to express the chances mentioned above. A fall detection algorithm determines the likelihood that a suspected event is a fall indeed. If that likelihood is above a threshold the algorithm decides the event is a Positive. The larger the margin (above that threshold), the more likely the event is indeed a fall.

In some embodiments, cancel configurations available for selection include a two-stage configuration type with a first-stage configuration to accept a cancel alarm input followed by a second-stage configuration to accept confirmation of the cancellation. This can be seen as comparable to real-world safety controls in which accidental use is prevented by a two-stage process. An input variation within the two-stage configuration type may include a change in the display layout in the first stage configuration and/or the second stage configuration.

In some embodiments, cancel configurations available for selection include a two-component configuration type with a two-component configuration requiring two different input components from the user at the same time to accept a cancel alarm input. An input variation within the two-component configuration type may include a different timing requirement for one or both components.

In some embodiments, cancel configurations available for selection include one or more of: a single-button configuration type with a display format template including a single cancel button to cancel the alarm; a slide-line configuration type with a display format template including a line for the user to slide a finger along to cancel the alarm; a timed-button configuration type with a display format template including a timed cancel button to cancel the alarm; and a plural-button configuration with a display format template including more than one button which must be activated in a predefined order.

In the single-button configuration type, an input variation within the configuration type may vary the position of the button. In the slide-line configuration type, an input variation within the configuration type may vary the position and/or shape of the line. In the timed-button configuration type, an input variation within the configuration type may vary the length of time that button must be pushed. In the plural-button configuration type, an input variation within the configuration type may vary the positions of the buttons.

In any of the configuration types, the input variation may be provided by changing the configuration type or varying the input within the same configuration type. For example, if a fall-detection threshold is exceeded by a larger margin, the input may be varied within the same configuration type, whereas if the threshold is exceeded by a smaller margin, the configuration type may change (and there may also be an input variation from the previous time the new configuration type was used)

According to a second specific aspect, there is provided a method carried out by a wrist-worn emergency detection device with a sensor interface, a processor and a touch-sensitive display, the method comprising: triggering an alarm based on an emergency-detection input; selecting a cancel configuration of the device to accept a cancel alarm input from a user allowing alarm cancellation with an input that varies from a previous time a cancel configuration was selected; formatting the display with user instructions according to the cancel configuration; and cancelling the alarm when there is a cancel alarm input by the user in accordance with the user instructions.

According to a third specific aspect, there is provided a computer program enabling the processor of a wrist-worn detection device to carry out the method as described above.

According to a fourth specific aspect, there is provided a wrist-worn emergency detection device, the emergency detection device comprising a sensor interface, a processor and a touch-sensitive display, wherein the processor is arranged to: trigger an alarm based on an emergency-detection input from the sensor interface; select a cancel configuration of the device to accept a cancel alarm input from a user that requires the user to carry out two separate gestures; format the display with user instructions according to the cancel configuration; and cancel the alarm when there is a cancel alarm input by the user using the two separate gestures. Thus the fourth aspect also reduces false alarm rates by requiring the user to pay attention to the cancel action. This provides a more effective and accurate machine-human interaction. An equivalent method is also provided.

Cancel configurations available for selection may include a two-component configuration type with a two-component configuration requiring two different input components from the user at the same time to accept a cancel alarm input.

Cancel configurations available for selection may alternatively or additionally include a two-stage configuration type with a first-stage configuration to accept a cancel alarm input followed by a second-stage configuration to accept confirmation of the cancellation.

Cancel configurations available for selection may alternatively or additionally include a plural-button configuration with a display format template including more than one button which must be activated in a predefined order.

Features of the first to third specific aspect may be applied to this fourth specific aspect where not in contradiction with the fourth specific aspect. In particular, the cancel alarm input from a user may allow alarm cancellation only with an input that varies from a previous time a cancel configuration was selected.

Features of the device embodiments may be freely combined and applied to the method and computer program embodiments.

These and other aspects will be apparent from and elucidated with reference to the embodiments described hereinafter.

BRIEF DESCRIPTION OF THE DRAWINGS

Exemplary embodiments will now be described, by way of example only, with reference to the following drawings, in which:

FIG. 3 is a schematic diagram of different possibilities for the emergency-detection device operation;

DETAILED DESCRIPTION OF EMBODIMENTS

Embodiments require the user to pay attention to the cancel action, by changing at least one input (e.g. location, order on a screen, timing, swipe movement etc.) of the cancel control function or button or other mechanism. As a result, the user cannot cancel without looking at the watch and consciously identifying/targeting the cancel control. Despite this, the cancel action can still be easy to do, because users should not feel stressed about cancelling a false alarm. The risk of cancelling a fall alarm unintentionally, without being aware of doing so, is mitigated.

Figure 1:
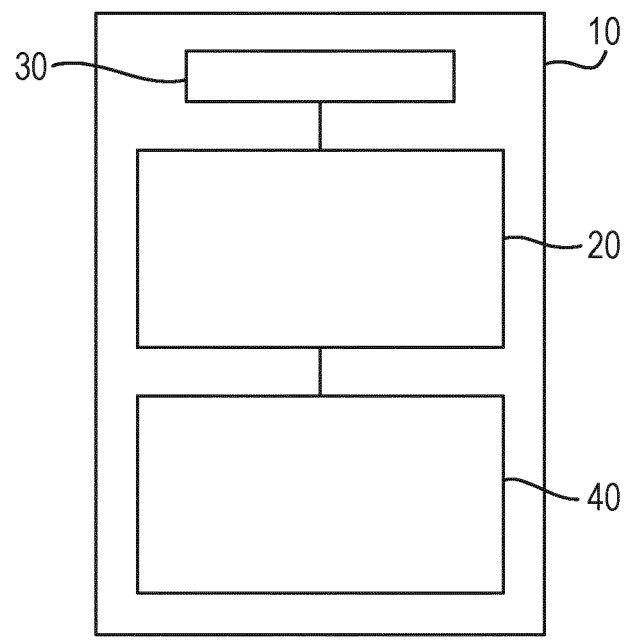
FIG. 1 is block diagram of an embodiment of an emergency-detection device.

FIG. 1 shows a general embodiment of a wrist-worn emergency-detection device. The device 10 includes a processor 20, a sensor interface 30 to the processor (the device may also include one or more sensors connected to the sensor interface, such as an accelerometer, which is not shown), and a touch-sensitive display 40 acting as a User Interface (UI). For simplicity, a memory and other usual components of such a device are not depicted, but the skilled reader will appreciate that they may be provided as necessary.

In general, the device 10 can be any type of electronic device or computing device. In some implementations, the device 10 is an apparatus that is worn by the user. For example, the apparatus can be, or be part of, a smartwatch, or be integrated into an item of clothing (e.g. a shirt, etc.) or be in the form of a wearable accessory (e.g. a wrist band).

It will be appreciated that a sensor such as an accelerometer may be part of the device 10 in FIG. 1, or in other implementations, may be separate from the device, in which case it may be connected using a wired connection or wirelessly to the device 10, including the processing unit/processor 20 (e.g. via the sensor interface 30). For example, an accelerometer may be part of a smart watch and the processor 20 can be part of a smart phone to which the smart watch is paired. Sensors in the smart phone can also be used by the detection algorithm.

Regardless of the implementation of the device 10 and the location of an accelerometer with respect to the device 10, the accelerometer can generate a measurement signal that contains a plurality of acceleration measurement samples representing the movements of the user at a plurality of time instants. The accelerometer is typically an accelerometer that measures accelerations in three dimensions, and the measurement signal generated by the accelerometer can include respective measurement signals representing the accelerations in each of the three dimensions. For example, the accelerometer can output respective measurement signals for each of an x-axis, y-axis and z-axis of a Cartesian coordinate system.

In another embodiment, the sensor assesses the user for a cerebrovascular accident, CVA or stroke, using a photoplethysmograph (PPG). This technology is well suited to apply at the wrist. It may not be sensitive enough for fall detection, but may complement the information extracted from the inertial sensors (accelerometer, gyroscope, air pressure, etc.).

Figure 2:
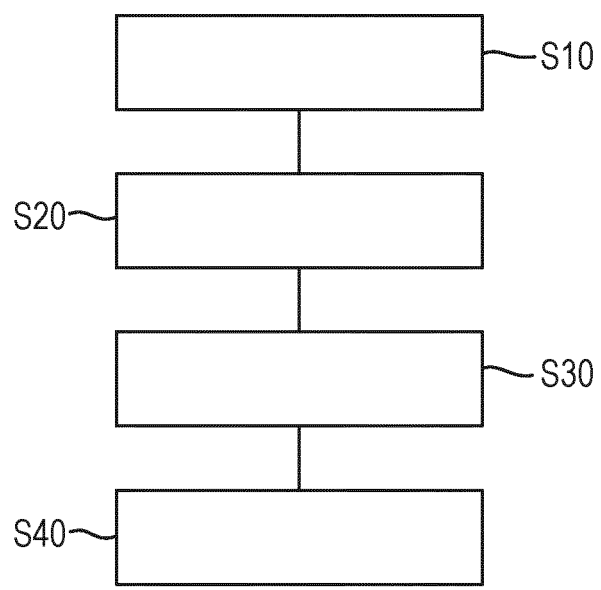
FIG. 2 is a flow chart of a method carried out by a processor of the emergency detection device.
Figure 4A:
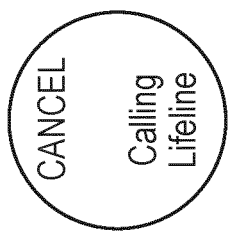
FIGS. 4a to 4d are diagrams of a screen showing a succession of four different display formats of one configuration type.
Figure 4B:
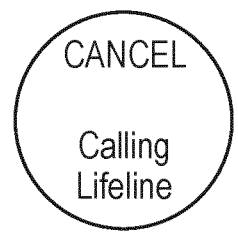
Figure 4C:
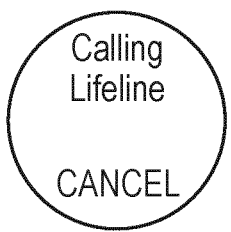
Figure 4D:
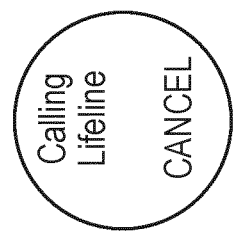

FIG. 2 shows the method carried out by the device in a general embodiment. In S10, the processor triggers an alarm based on detection of an emergency (such as a fall or CVA) from the sensor(s) via the sensor interface. One interface may be provided per sensor or there may be a single interface for a plurality of sensors. In S20, the processor selects a cancel configuration of the device. The configuration accepts a cancel alarm input from a user allowing alarm cancellation with an input that varies from a previous time a cancel configuration was selected. For example, the input varies from the most recent time that a cancel configuration was selected by the processor. In S30, the processor formats the display with user instructions according to the cancel configuration. In a simple example, a cancel text (such as "cancel" or "stop alarm") may be shown, thus indicating that the user should press the text (or text button) to cancel the alarm. In S40, the processor cancels the alarm if there is a cancel alarm input by the user in accordance with the user instructions (and thus in conformance with the cancel configuration selected).

In one embodiment, an application running on the device will not show a recently used user interface (i.e. not show the same variations for all characteristics as before). This avoids the user reproducing the same control action as one of the last times he/she wanted to cancel an alarm.

In another embodiment, the application can learn which cancel user interface variations require more attention of the user: either because it takes the user more time to complete the control action, or because the user sometimes made a mistake when performing that particular control action. The application may then show a cancel UI variation of which the estimated "required attention span" is appropriate for the likelihood of detecting a real fall (true positive). The more likely someone did fall, the more difficult it should be to cancel the fall. The more likely that someone did not fall (or did fall but does not need help), the easier it should be to cancel the fall (easier means: less attention required of the user while cancelling).

FIG. 3 depicts an embodiment which includes both these embodiments and is carried out by an application running on the device. When a fall is detected, a cancel configuration is selected, giving at least one variation of a cancel UI. In case a) the fall detection application randomly (or pseudo-randomly using an algorithm) selects a variation of one or more characteristics of the cancel UI. In case b) the application will not show a recently applied cancel user interface. For example it will not show the same UI as was shown for the last three emergency detections. In case c), the application will adapt the cancel UI shown to the likelihood of a true positive as explained in more detail for one implementation below.

There are three possibilities for user input shown. Firstly there may not be a cancelling action (no input or the "wrong" input, that does not cancel the alarm). Secondly, there may be a cancel input even if a fall has been correctly detected (the user does not need assistance). Thirdly, there may be a cancel input if a fall has been incorrectly detected (a false positive). In all cases, the selected configuration may be stored, to avoid reproducing the same configuration the next time an alarm is triggered. For the latter two cases, when the alarm has been cancelled, the response time of the user and/or accuracy of input may be stored.

In case c) mentioned above, an algorithm determines the likelihood of a true positive. Based on this, the application selects an appropriate cancel UI variation. The more likely it is that the captured data indeed represents a true positive, the more attention is required to control the selected cancel user interface. The algorithm may be generic or related to the specific user.

In a further embodiment of case c): the application monitors the response time of the user to variations on the cancel UI and learns which variations of the UI take the user relatively more time to use. It applies one of these "slow response" UI variations when the algorithm indicates high likelihood of a TP (real fall). Vice versa it applies a "quick response" UI in case of low likelihood of a TP (hence when the chance is higher that it is a false alarm).

More precisely, the outcome of the fall detection algorithm can be taken as a metric to estimate whether the detected event is indeed likely to be a fall. Basically, the algorithm computes from the sensor signal some so-called feature values. Examples include a height change, an impact size and an orientation change. From earlier data it has been determined what the typical values are for these features, both in case of a fall and in case of an arbitrary, "daily", movement, which was not a fall. From the distribution of the occurrence of these values, the likelihood can be computed that a next, observed value stems from a fall or a non-fall. Then, the detector decides on a fall when that likelihood passes a preset threshold. Now, as a refinement, the degree of randomization of displaying the cancel button may be controlled, based on the distance from the determined likelihood to the threshold. When close to the threshold, there will be little randomization (for example only one type of input variation is applied of the same configuration type is used with a single variation). A user may press the watch's screen below the sleeve without looking at it; thus keeping it unnoticed to others in the room. When the determined likelihood exceeds the threshold by a large amount, the randomization is strong (for example by using a different configuration type); thus reducing the risk the user may unintentionally cancel the alarm.

In fact, the degree of variation for the next UI might also be driven by the cancelling behaviour of the user: the cancelling may hint for which likelihood values an events is typically of low likelihood for this user. More variation may be applied to the configuration for these 'low likelihood' cases.

An alternative design can be a neural net, or another machine as is well known in the art or Artificial Intelligence and its sub-disciplines Machine Learning and Deep Learning in particular. In that case, there is no explicit computation of features values like orientation, impact and height change. Instead the machine takes the sensor signals directly and, after having been trained with a large set of examples, it outputs a score for every next event presented to its input. The large set of training examples holds signals that are labelled as stemming from a fall or a non-fall movement. They are used to let the machine configure its internal parameters, such that the detection accuracy is optimized. These learning techniques are well known in the art. Usually, the output score of the machine is interpreted as the probability that the event is indeed a fall. In this view, the output score can be taken in the same way as the previous likelihood to determine a margin above threshold, so as to control the level of variation and difficulty in the cancel operation.

The main elements of the invention describe the principle of adjusting the required level of attention of the user to cancel an alarm. In the following various physical embodiments, possible methods to achieve this will be described. These embodiments can be combined to add complexity.

[1] Show Cancel Function on a Different Location

The user has to look at the screen, to determine where to hit the screen. This triggers the user's attention, and makes the user aware of what he/she is doing. As a result, status information shown on the watch may also have to be relocated. To support the user in identifying the cancel button, redundant coding, such as color coding, or visualizing a button behind the "CANCEL" text may be used. FIG. 4 shows an embodiment with a configuration type with a display format template in which there is a single cancel button and a status indication button ("Calling Lifeline"). The cancel button is not shown expressly as a button, but pressing the text "CANCEL" will cancel the alarm. Four different display formats are shown in this configuration type, as FIGS. 4a to 4d. In the first format, the buttons are shown extending with vertical text to the left and right of the screen. In the second format, the status indication and cancel button are in the same relative position to each other but a different rotational position on the display (rotation by 90 degrees clockwise, so the text is horizontal). In the third format the positions of the two buttons are exchanged. In the fourth format, the status indication and cancel button are in the same relative position to each other as the third format but a different rotational position on the display (rotation by 90 degrees anti-clockwise, so the text is vertical).

[2] Require a Precise Gesture

Figure 5:
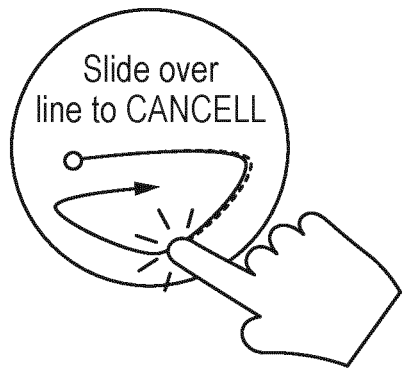
FIG. 5 is a diagram of a screen showing a different configuration type.
Figure 6A:
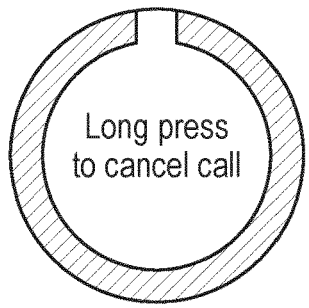
FIGS. 6a to 6d are diagrams of a sequence of screens in a further configuration type.
Figure 6B:
Figure 6C:
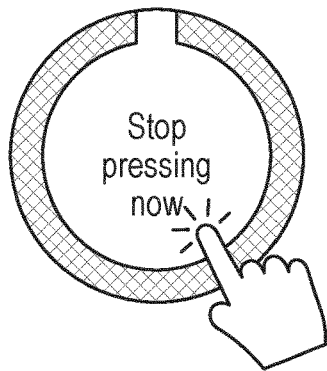
Figure 6D:
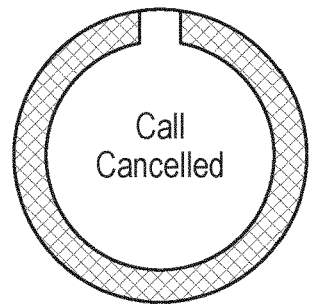

The user has to look at the screen, to track the entire swiping shape with a finger. First the user has to position his/her finger on the start of the displayed line, next the user has to slide his/her finger over the screen following that line. This shape could change the next time to keep the user even more alert, especially useful when a user becomes very skilled at making the movement. FIG. 5 shows an embodiment with a slide-line configuration type, having a display format template with a curved line displayed and instructions for the user to slide the finger over/along the line. The start of the line is shown as an initial enlarged dot.

[3] Require a Long Press and Vary its Required Duration

The user has to keep pressing the cancel button (on-screen button or a physical button) during a specific period. The UI communicates to the user how long this period lasts, and when it ends. The user has to stop pressing the screen as soon as the period has ended. If the user stops pressing the screen too early or too late, the alarm is not cancelled. As a result, the user has to pay attention to the cancel action.

For example, the screen could visualize a progress bar that indicates how long to press the button and also shows when to stop pressing the button. FIG. 6 shows an embodiment with a timed-button configuration type having a display format template including a timed cancel button to cancel the alarm. The Figure shows a display with a progress bar around the external contour of the display which changes colour as it is pressed, and a series of instructions to the user, indicating in succession to press the display, to keep pressing the display (the same text may continue to be displayed) and to stop pressing, then that the call has been cancelled.

[4] Require a More Complex Gesture

Figure 7:
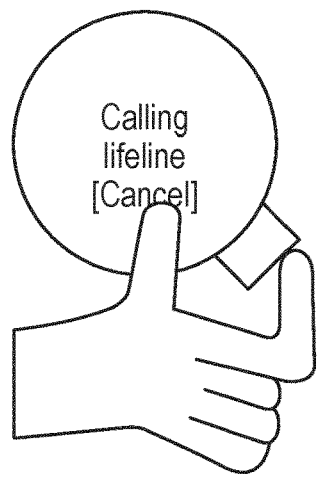
FIG. 7 is a diagram of a screen with a two-component configuration type.

The user has to touch the screen while also pressing a physical button on the device with another finger. Because this requires to correctly use two fingers of one hand simultaneously, this requires the user to look at the watch and pay attention. FIG. 7 shows an embodiment of a two-component configuration type with a two-component configuration requiring two different input components from the user at the same time to accept a cancel alarm input. Here, the user must press a physical button to one side of the display at the same time as the display, which has a cancel text button. Either or both of the gestures may have a timing requirement which may be varied.

[5] Location of Multiple Buttons (Optionally Combined with Swiping).

Figure 8A:
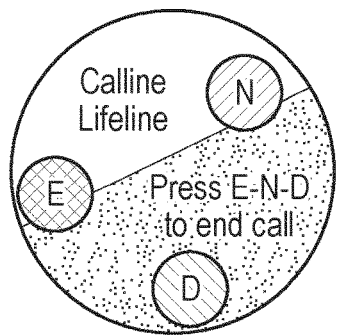
FIGS. 8a to 8c are diagrams of a screen showing a succession of three different display formats of a still further configuration type.
Figure 8B:
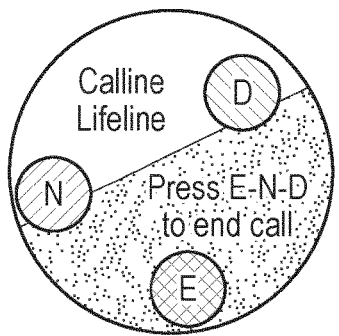
Figure 8C:
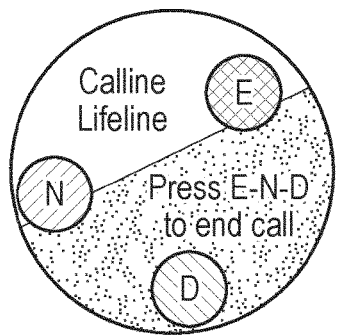
Figure 9A:
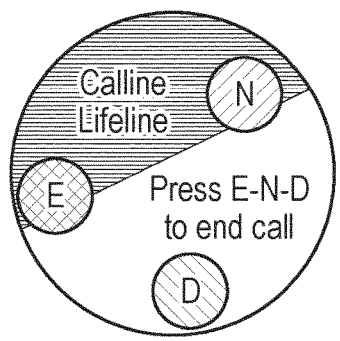
FIGS. 9a to 9c are diagrams of a screen showing a succession of three different display formats of the same configuration type as FIG. 8.
Figure 9B:
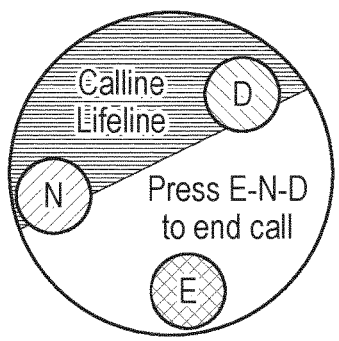
Figure 9C:
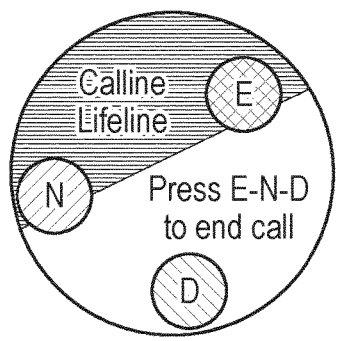

The user is required to press multiple buttons in a predefined sequence of separate gestures. The position of these buttons may be altered the next time the UI is shown, forcing the user to look at the screen to read/recognize the buttons. It is recommended to add a redundant coding (e.g. shape, colour, or saturation) to facilitate recognition of the buttons. The buttons may be activated by swiping or separate activation. FIGS. 8 and 9 gives two examples of such a plural-button configuration with a display format template including more than one button which must be activated in a predefined order. In both examples, text buttons must be pressed to spell the word "end" and the display includes instructions ("press E-N-D to end call") as well as the "E", "N" and "D" buttons themselves. As an input variation and as shown by comparing FIGS. 8a, 8b and 8c, or 9a, 9b and 9c, the positions of the letters may swap to vary the input required by the user, but other movement of the buttons could also be used. These letter buttons may be shown in different colours, which can also vary, as indicated by the shading/cross-hatching. In FIG. 8, the indication "Calling Lifeline" is separated from the instructions by a hard line (and different background colouring), whereas in FIG. 9, the indication "Calling Lifeline" is simply on a different background colour (shown in cross-hatching).

[6] First Unlock the Cancel Control.

Figure 10A:
FIGS. 10a to 10d are diagrams of a sequence of screens in a two-stage configuration type.
Figure 10B:

The user has to carry out two different inputs or input gestures), similar to safety controls in the physical world, for example in which a safety cap is removed before pressing a stop button. The cap implicitly communicates that one should not use the button idly. FIG. 10 shows an example of this two-stage configuration type with a first-stage configuration to accept a cancel alarm input followed by a second-stage configuration to accept confirmation of the cancellation. The display is shown at four successive times. At a first display time when a fall is detected, the device shows an information screen part and an instruction screen part instructing the user how to cancel the alarm (FIG. 10a). Here, the display is in the form of a help-info screen part forming the majority of the display and indicating that an alarm is to be sent, while a smaller portion is a stop screen part. In this configuration type, the "end call" button is unlocked by sliding the help-info screen part away (down) to reveal an enlarged stop screen part stating that help is not required, as shown at the second display time (FIG. 10b). Alternatively, pressing the stop screen part may allow it to be fully revealed (the help-info screen slides away while the stop screen part is pressed), or the user can press repeatedly on the stop screen part so that the help-info screen part retreats in steps.

Figure 10C:
Figure 10D:

In the second stage, a stop alarm button appears to replace the reduced help-info screen part and is pressed by the user as shown at the third display time (FIG. 10c). A fourth display time has the display showing that the alarm has been cancelled, with a button available to call for help (FIG. 10d).

Figure 11A:
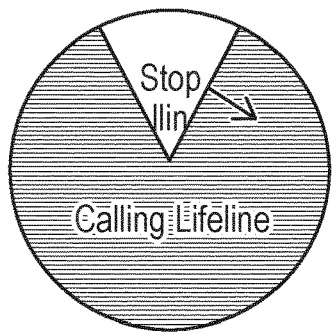
FIGS. 11a and 11b are diagrams of alternatives in a further two-stage configuration type.
Figure 11B:
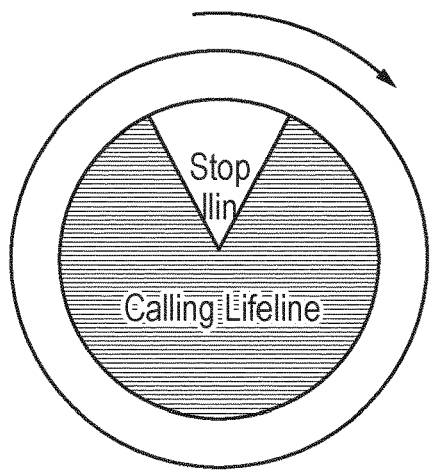
Figure 12A:
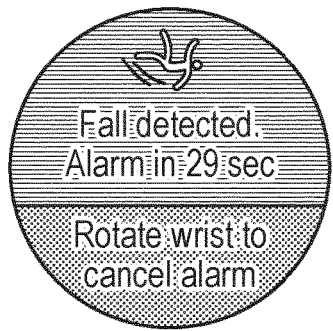
FIGS. 12a to 12e are diagrams of a sequence of screens and positions in a still further two-stage configuration type.
Figure 12B:
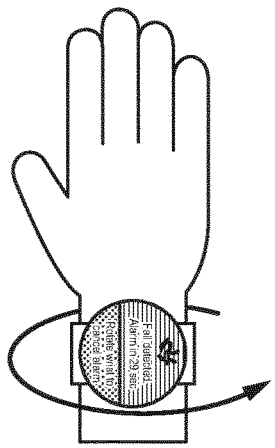
Figure 12C:
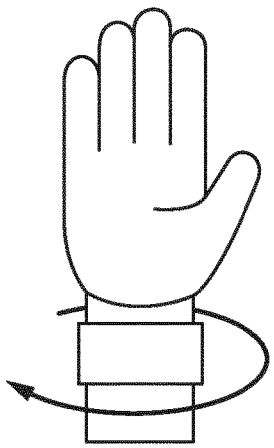
Figure 12D:
Figure 12E:
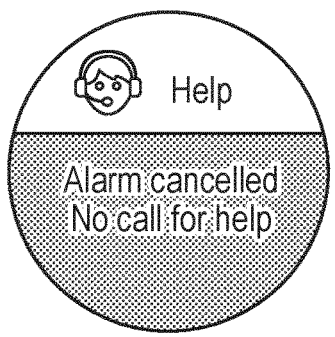

FIG. 11 shows a different way of providing a two-stage configuration type. Here, an angular cut-out in an alarm screen indicating that the alarm has been called gives a glimpse of the stop alarm button "underneath". In the first stage, rotary movement of a finger on the screen in FIG. 11a (or of a physical ring on the device in FIG. 11b) allows the alarm screen to be reduced in angular size to reveal the stop button and allow it to be pressed in the second stage.

FIG. 12 shows a further different way of providing a two-stage configuration type. Here, the user must make a gesture to rotate his/her wrist in the first stage and then press a button to confirm the cancellation in the second stage. At a first display time when a fall is detected, the device shows an information screen part and an instruction screen part instructing the user to rotate the wrist to cancel the alarm (FIG. 12a). The user rotates his/her wrist (FIGS. 12a and 12b) and then the display changes for the second stage so that the instruction part screen part now instructs the user to press that part of the screen to confirm cancellation (FIG. 12d). Finally, the display shows that the alarm has been cancelled, with a button available to call for help (FIG. 12e).

[7] Vary Time to Cancel

Figure 13A:
FIGS. 13a to 13c are diagrams of a sequence of screens in a screen-covering configuration type.
Figure 13B:
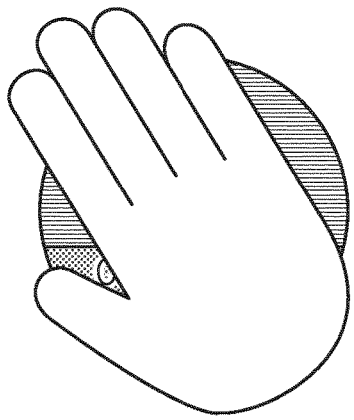
Figure 13C:
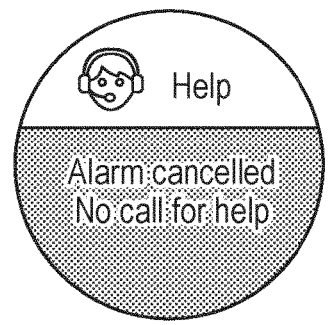
Figure 14A:
FIGS. 14a to 14d are diagrams of a succession of display formats triggered with different configuration types.
Figure 14B:
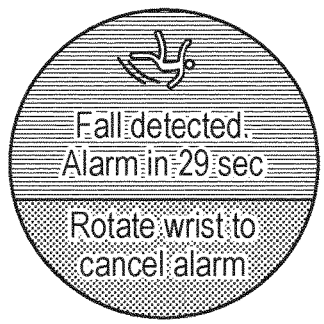
Figure 14C:
Figure 14D:
Figure 15A:
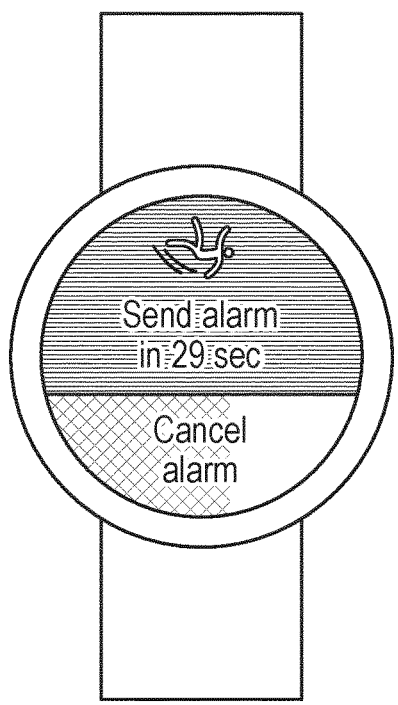
FIGS. 15a to 15d are diagrams of a different succession of display formats triggered with different configuration types.
Figure 15B:
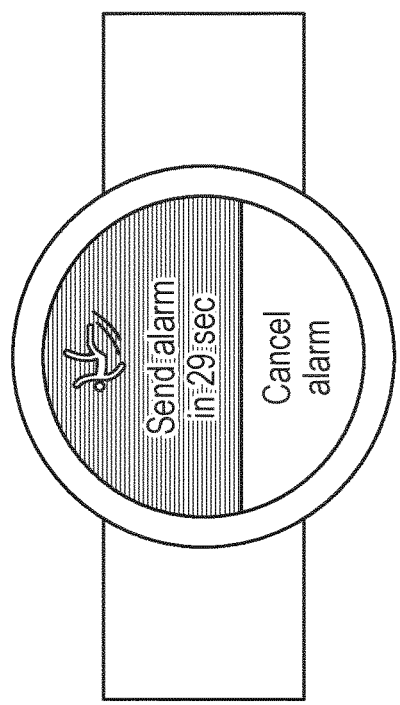
Figure 15C:
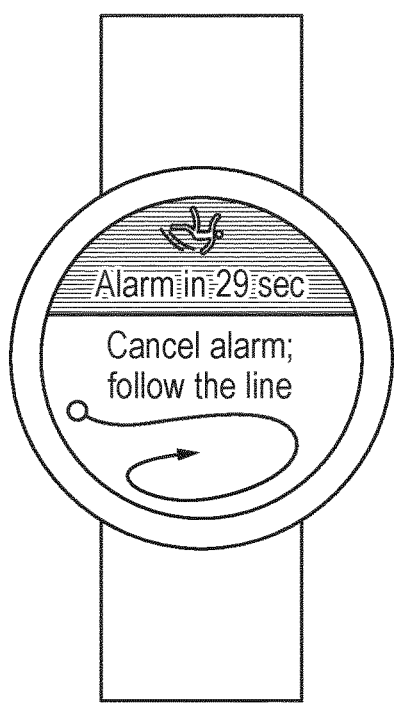
Figure 15D:
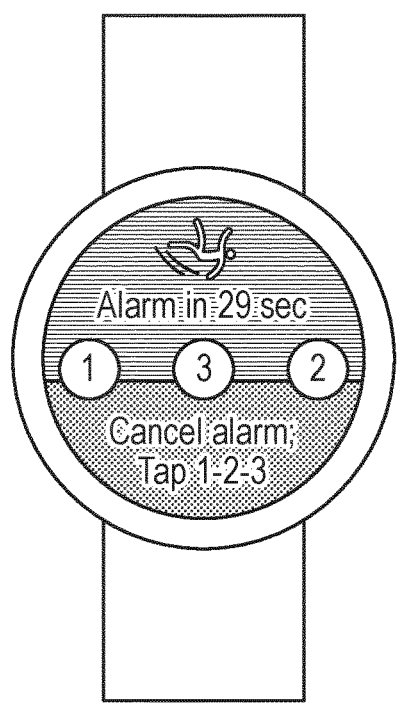
Figure 16A:
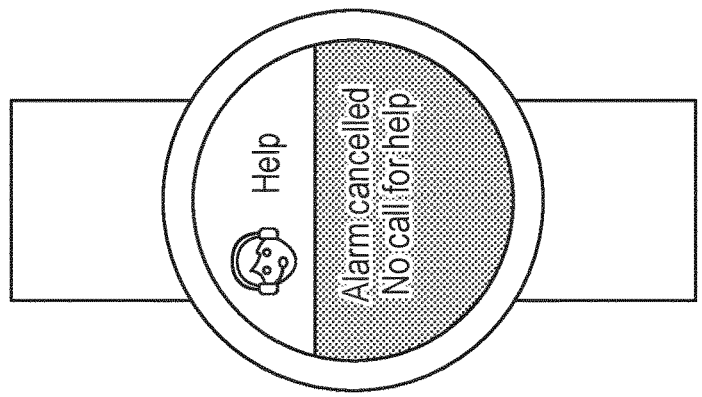
FIGS. 16a to 16k are diagrams of a still further succession of screens triggered with different configuration types.
Figure 16B:
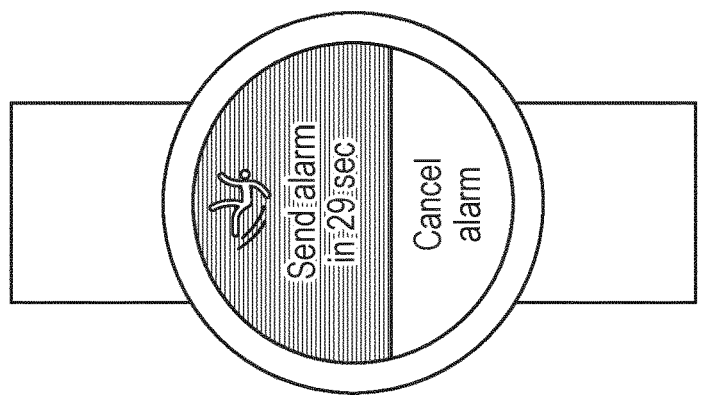
Figure 16C:
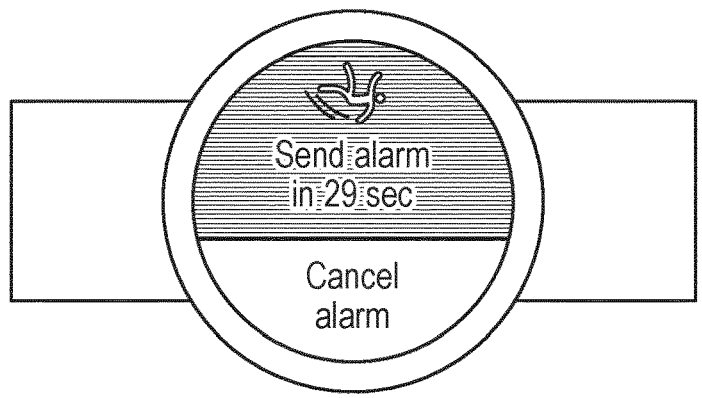
Figure 16D:
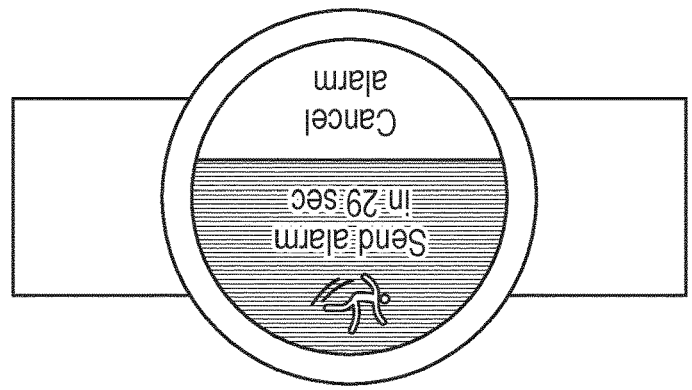
Figure 16E:
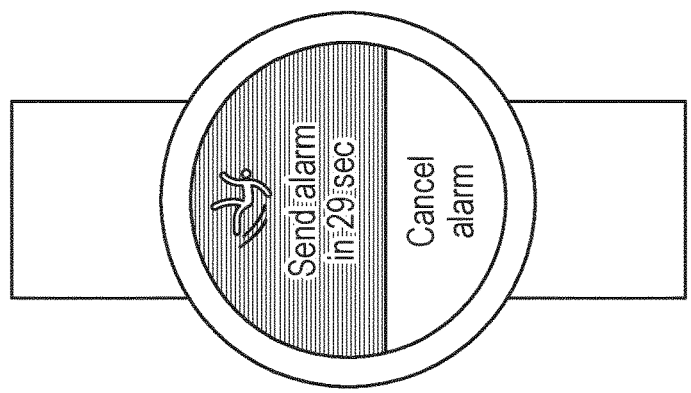
Figure 16F:
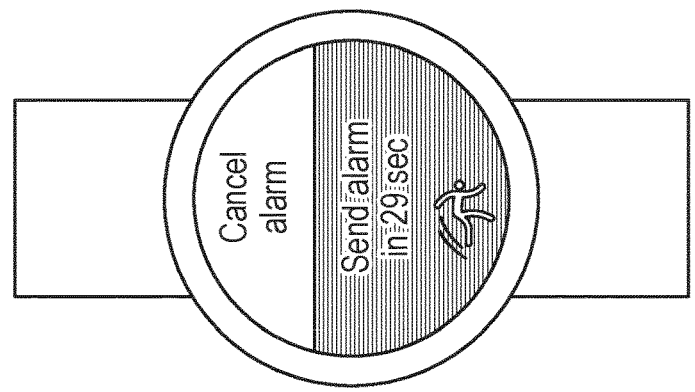
Figure 16G:
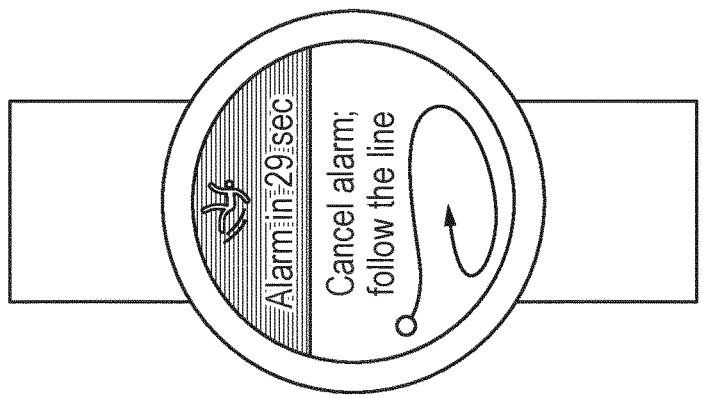
Figure 16H:
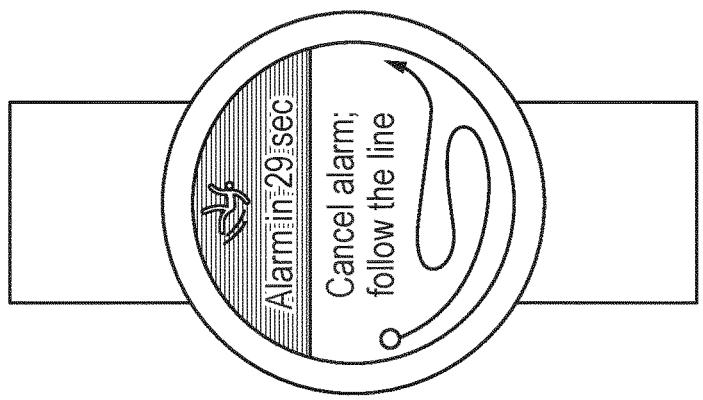
Figure 16I:
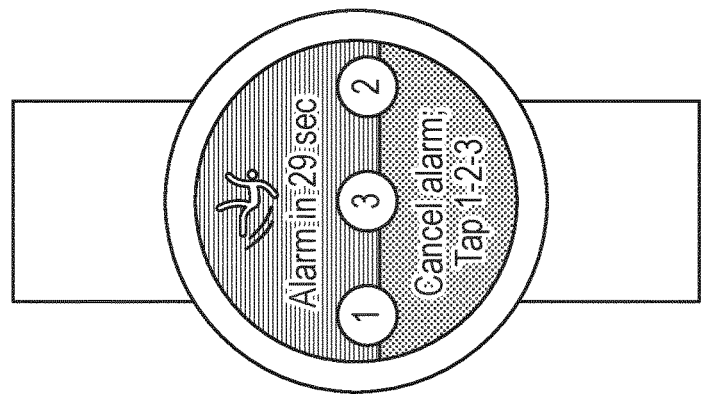
Figure 16J:
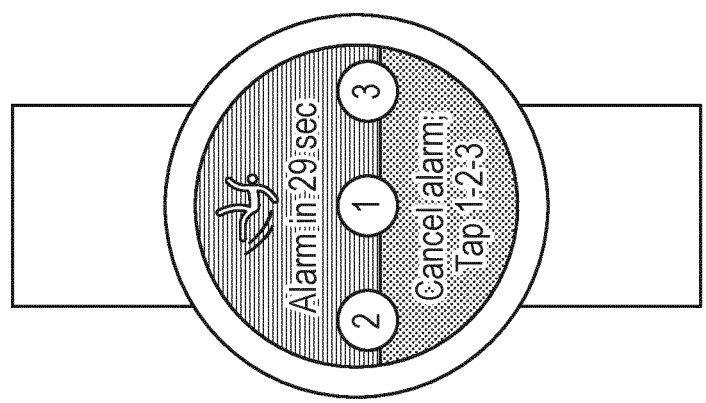
Figure 16K:
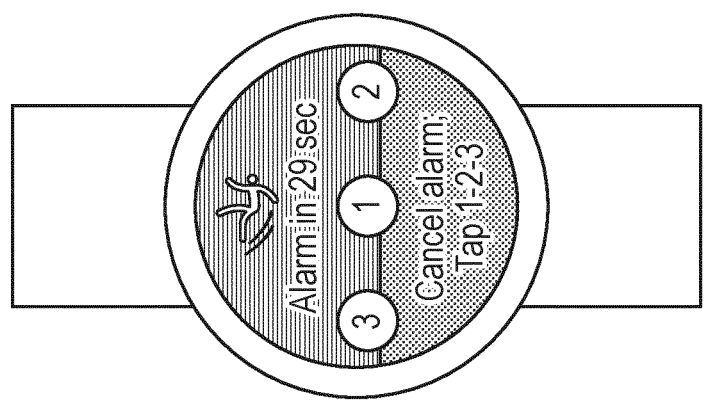

The cancel gesture is covering the screen until it vibrates (or stops vibrating). The watch varies how long the user will have to keep the hand on the watch or other device. The user has to remove their hand as soon as it vibrates (within a specified reaction time, e.g. 1 second). If user does not pay attention, he/she will remove hand too soon or too late, and the alarm is not cancelled. FIG. 13 shows this embodiment. At a first display time when a fall is detected, the device shows an information screen part and an instruction screen part instructing the user to cover the device screen (watch) to cancel the alarm (FIG. 13a). The user covers the watch for the required length of time (FIG. 13b) and finally the display shows that the alarm has been cancelled, with a button available to call for help (FIG. 13c).

Invention embodiments which vary the input required may select between different available configuration types to vary the input or require input variations within the same configuration type. FIGS. 14 and 15 show variation between different configuration types.

In FIG. 14, each display shown is the first screen triggered by the fall detection, in which the device shows an information screen part and an instruction screen part instructing the user how to cancel the alarm. The watch displays which cancel method (configuration type) to apply on each occasion. It will select one method from a specific range of cancel methods. (It is recommended that the user has trained in these methods before.) This selection could be influenced by the fall detection algorithm outcome: if it seems to be a hard fall or be a long way over a trigger threshold, the watch may select the hardest method. The method may be easy in general for all users, or easy specifically for this user (in which case watch has learned which method is easier by detecting response time and use errors). Cancel methods can address a different modality after each fall detection. In FIG. 14, the first instance requires a hand gesture to cover the watch (FIG. 14a), the second instance requires a wrist/arm rotation gesture to rotate the device (FIG. 14b), the third instance requires a screen pull-down (FIG. 14c) and the fourth instance requires voice control (FIG. 14d).

In FIG. 15, the same modality is used on each occasion, in the sense that a same type of hand gesture (an input to the touchscreen) to touch the watch is always required. In the first instance (FIG. 15a), there is a single cancel button which turns gradually to a different colour and the user needs to press the button until it is all the different colour illustrated by the cross-hatching (or the user must press twice, once to start cancellation and once to confirm it), in the second instance the same screen is rotated by 90 degrees and a single press is required only (FIG. 15b), in the third instance the user is required to follow a curved line (FIG. 15c), and in the fourth instance the user must press three separate buttons in the order 1-2-3 (FIG. 15d).

FIG. 16 shows a sequence of cancel configurations in vertical order with input variations within the same configuration type and by changing configuration type. In the first instance in FIG. 16a, the display is when there has been no trigger/a previous alarm has been cancelled. This help screen includes a help button and a note that the alarm has been cancelled and there is no call for help. It follows each new cancel configuration, but is not depicted each time between the subsequent screens in FIG. 16, for simplicity of comparison. In FIG. 16b, an alarm has been triggered, and the interactive solution requires the user to press twice (to start cancellation and to confirm cancellation once the button is fully a different colour). The watch varies how long it takes the button to be fully of the different colour. In an alternative the user has to press the button until it is fully a different colour and then release it. This can have the same time-dependency as pressing/tapping twice. The help screen follows a cancellation. FIG. 16c shows the screen on the subsequent alarm activation, which has a new configuration type and display template, and has also been rotated 90 degrees. In this screen, the user must press the stop button to cancel the alarm. The help screen follows a cancellation. FIG. 16d shows the screen on the subsequent alarm activation, which has the same configuration type and template as FIG. 16c, but rotated 180 degrees. The help screen follows a cancellation. FIG. 16e shows the screen on the subsequent alarm activation, which has the same configuration type and template as FIG. 16d, but rotated clockwise by 90 degrees. The help screen follows a cancellation. FIG. 16f shows the screen on the subsequent alarm activation, when the positions of the stop button and information button have been exchanged with respect to FIG. 16e. In this case the buttons have retained the same colour, but their colour could also change. The help screen follows a cancellation. FIG. 16g shows the screen on the subsequent alarm activation, when a new configuration type requires the user to follow a line on the screen. The help screen follows a cancellation. FIG. 16h shows the screen on the subsequent alarm activation, when there is the same configuration type but the user is required to follow a different line on the screen. The help screen follows a cancellation. FIG. 16i shows the screen on the subsequent alarm activation, when there is a new configuration type requiring the user to press buttons 1-2-3. The help screen follows a cancellation. FIG. 16j shows the screen on the subsequent alarm activation, when there is the same configuration type requiring the user to press buttons 1-2-3, but the buttons are in exchanged positions. The help screen follows a cancellation. Finally, FIG. 16k shows the screen on the subsequent alarm activation, when there is the same configuration type requiring the user to press buttons 1-2-3, but the buttons are again in exchanged positions, which are also different from the positions in FIG. 16i.

All the above embodiments (and all combinations between embodiments) are suitable for use in an auto-alert fall or other emergency detector for home monitoring and activation of a remote alarm. The embodiments are in fact suitable for any type of fall detector, for patient monitoring, hospital to home, and also Public Health Services, PHS The embodiments are especially suitable for fall detector applications that are less optimized for fall detection, for example, fall detection applications that run on a smart phone or smart watch. Because of the wider range of motions, detection accuracy will be compromised and a cancelling button is needed, while the potential subsequent fall is less clearly detectable. These devices contain user interaction technologies that enable screen-based control.

Figure 17:
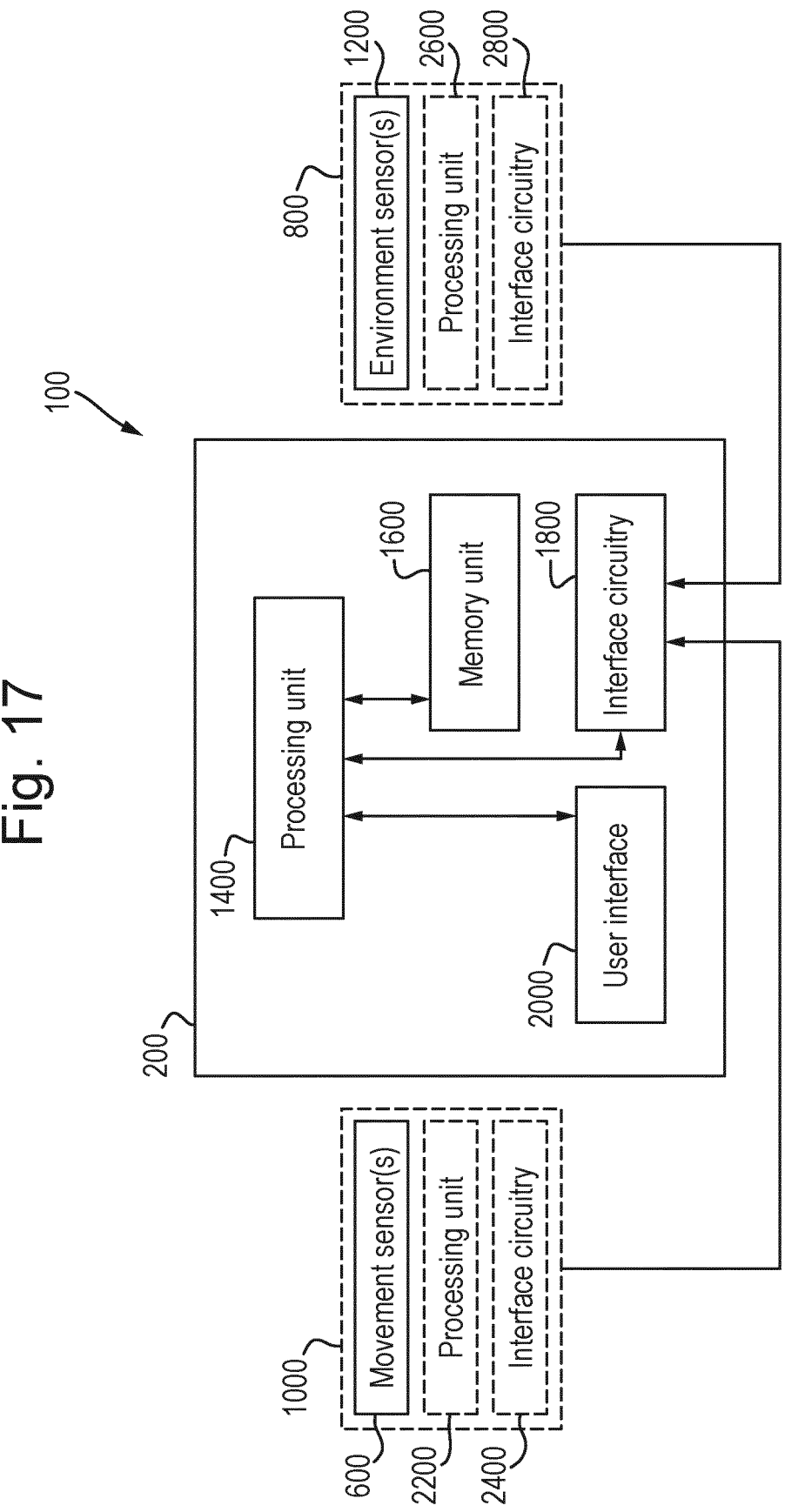
FIG. 17 is a block diagram of an embodiment of an emergency-detection device.

FIG. 17 illustrates an exemplary fall detection apparatus (or device) 200 that can be used to implement various embodiments of the invention. The apparatus 200 is shown as part of a system 100 that includes one or more movement sensors 600 that are provided to measure the movements of a subject and one or more environment sensors 800 that are provided to measure an aspect of the environment of the subject. The fall detection apparatus 200 is provided for detecting if a subject has fallen by comparing a status of the subject prior to a potential fall (as determined from measurements from the environment sensor(s) 800) to an initial state for a type of fall associated with any fall detection algorithm that has detected a potential fall by the subject (as determined from measurements from the movement sensor(s) 600), and outputting an indication that the subject has fallen if there is a match between the status and an initial state. As such, the fall detection apparatus 200 can also be referred to as a fall decision apparatus 200 since it takes a final decision on whether a fall has occurred and an alarm should be triggered or an alert issued.

In some embodiments, the measurements from the movement sensor(s) 600 are provided to the fall detection apparatus 200, and the fall detection apparatus 200 analyses the movement measurements using a plurality of fall detection algorithms to detect a potential fall by the subject. For example, the sensors are in a hearing aid. The cancel (and help) function are with the remote control of the hearing aid, or are in the (smart-watch) wrist device. In other embodiments, the movement sensor(s) 600 can be integral with the fall detection apparatus 200. In this case, the fall detection apparatus 200 can be worn or carried by the subject, and may be in the form of a watch, bracelet, etc. In other embodiments, the movement sensor(s) 600 are part of a separate fall detection assembly 1000 (indicated by dashed box 1000 around the movement sensor(s) 600), and the fall detection assembly 1000 applies the fall detection algorithms to the movement measurements to detect a potential fall by the subject. The fall detection assembly 1000 can be carried or worn by the subject, and can, for example, include a Personal Help Button (PHB). The fall detection assembly 1000 can be in the form of a watch, bracelet, necklace, chest band, etc. It will be appreciated that the fall detection assembly 1000, where present, merely provides an input to the fall detection apparatus 200 indicating the outcome of the analysis of the movement measurements by the plurality of fall detection algorithms. The fall detection apparatus 200 determines whether a fall alert should be issued based on a comparison of the fall detection algorithm results with the status of the subject determined from the environment sensor(s) 800. In some alternative embodiments, the functions of the fall detection apparatus 200 described herein are part of, or implemented by, the fall detection assembly 1000. In these embodiments, the fall detection apparatus 200 can be worn or carried by the subject, and may be in the form of a watch, bracelet, necklace, chest band, etc., and may include or be connected to the movement sensor(s) 600.

In some embodiments, the measurements from the environment sensor(s) 800 are provided to the fall detection apparatus 200, and the fall detection apparatus 200 analyses the measurements to determine a status of the subject. In other embodiments, one or more of the environment sensor(s) 800 can be integral with the fall detection apparatus 200 (with optionally other environment sensor(s) 800 being separate from the fall detection apparatus 200). In other embodiments, the environment sensor(s) 800 are part of a monitoring system 1200 (indicated by dashed box 1200 around the environment sensor(s) 800). In some alternative embodiments, the functions of the fall detection apparatus 200 described herein are part of, or implemented by, the monitoring system 1200.

It will be appreciated that various combinations of the embodiments in the preceding two paragraphs is possible. For example, the fall detection apparatus 200 can perform all of the processing of the sensor measurements (e.g. analysis of the movement measurements received from the movement sensor(s) 600 using a plurality of fall detection algorithms and analysis of the environment sensor measurements received from the environment sensor(s) 800 (where one of the movement sensor(s) 600 and environment sensor(s) 800 may be integral with the fall detection apparatus 200) to determine the status of the subject), perform none of the processing of the sensor measurements (e.g. the fall detection apparatus 200 receives the result of the fall detection algorithm analysis from fall detection assembly 1000 and receives the status of the subject from the monitoring system 1200), or perform the processing of one set of sensor measurements while receiving the result of the processing of the other set of sensor measurements. In any of the above embodiments, the one or more movement sensors 600 are carried or worn by the subject, and the one or more environment sensors 800 are located in the environment of the subject (i.e. they are not necessarily worn or carried by the subject).

The fall detection apparatus 200 includes a processing unit or processor 1400 that controls the operation of the fall detection apparatus 200 and that can be configured to execute or perform the methods described herein. The processing unit 1400 can be implemented in numerous ways, with software and/or hardware, to perform the various functions described herein. The processing unit 1400 may comprise one or more microprocessors or digital signal processor (DSPs) that may be programmed using software or computer program code to perform the required functions and/or to control components of the processing unit 1400 to effect the required functions. The processing unit 1400 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 1400 is connected to a memory unit 1600 that can store data, information and/or signals for use by the processing unit 1400 in controlling the operation of the fall detection apparatus 200 and/or in executing or performing the methods described herein. In some implementations the memory unit 1600 stores computer-readable code that can be executed by the processing unit 1400 so that the processing unit 1400 performs one or more functions, including the methods described herein. The memory unit 1600 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM) and electrically erasable PROM (EEPROM), implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

The fall detection apparatus 200 also includes interface circuitry 1800 for enabling a data connection to and/or data exchange with other devices, including any one or more of servers, databases, user devices, and sensors. The connection may be direct or indirect (e.g. via the Internet), and thus the interface circuitry 1800 can enable a connection between the fall detection apparatus 200 and a network, such as the Internet, via any desirable wired or wireless communication protocol. For example, the interface circuitry 1800 can operate using Wi-Fi, Bluetooth, ZigBee, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 1800 (and thus fall detection apparatus 200) may include one or more suitable antennas for transmitting/receiving over a transmission medium (e.g. the air). Alternatively, in the case of a wireless connection, the interface circuitry 1800 may include means (e.g. a connector or plug) to enable the interface circuitry 1800 to be connected to one or more suitable antennas external to the fall detection apparatus 200 for transmitting/receiving over a transmission medium (e.g. the air). The interface circuitry 1800 is connected to the processing unit 1400.

The interface circuitry 1800 can be used to receive movement measurements from the movement sensor(s) 600 or, where the movement sensor(s) 600 are part of a fall detection assembly 1000, the interface circuitry 1800 can be used to receive the result of the analysis of movement measurements by a plurality of fall detection algorithms. The interface circuitry 1800 can also be used to receive measurements from the environment sensor(s) 800, or, where the environment sensor(s) 800 are part of a monitoring system 1200, the interface circuitry 1800 can be used to receive the determined status of the subject.

The interface circuitry 1800 can also be used to output an indication that the subject has fallen. In that case, the interface circuitry 1800 can communicate the indication to a call centre or the emergency services and/or communicate the indication to a user device of a physician or care provider.

The fall detection apparatus 200 comprises a user interface 2000 that includes one or more components that enables a user of fall detection apparatus 200 (e.g. the subject, or a care provider for the subject) to input information, data and/or commands into the fall detection apparatus 200, and/or enables the fall detection apparatus 200 to output information or data to the user of the fall detection apparatus 200. An output may be an audible alarm or alert that the subject has fallen. The user interface 2000 can comprise any suitable input component(s), including but not limited to a keyboard, keypad, one or more buttons, switches or dials, a mouse, a track pad, a touchscreen, a stylus, a camera, a microphone, etc., and the user interface 2000 can comprise any suitable output component(s), including but not limited to a display screen, one or more lights or light elements, one or more loudspeakers, a vibrating element, etc.

The fall detection apparatus 200 can be any type of electronic device or computing device. For example the fall detection apparatus 200 can be, or be part of, a server, a computer, a laptop, a tablet, a smartphone, a smartwatch, etc.

It will be appreciated that a practical implementation of a fall detection apparatus 200 may include additional components to those shown in FIG. 17. For example the fall detection apparatus 200 may also include a power supply, such as a battery, or components for enabling the fall detection apparatus 200 to be connected to a mains power supply.

In embodiments where the movement sensor(s) 600 are part of a fall detection assembly 1000, the fall detection assembly 1000 may include a processing unit (shown by dashed box 2200) for analysing the movement measurements using the plurality of fall detection algorithms and determining whether the subject has potentially suffered a fall. The fall detection assembly 1000 may also include interface circuitry (shown by dashed box 2400) for enabling the result of the analysis of the movement measurements to be communicated to the fall detection apparatus 2000. The processing unit 2200 and/or interface circuitry 2400 may be implemented in similar ways to the processing unit 1400 and/or interface circuitry 1800 in the fall detection apparatus 200.

In embodiments where the environment sensor(s) 800 are part of a monitoring system 1200, the monitoring system 1200 may include a processing unit (shown by dashed box 2600) for analysing the environment sensor measurements and determining the status of the subject. The monitoring system 1200 may also include interface circuitry (shown by dashed box 2800) for enabling the determined status to be communicated to the fall detection apparatus 200. The processing unit 2600 and/or interface circuitry 2800 may be implemented in similar ways to the processing unit 1400 and/or interface circuitry 1800 in the fall detection apparatus 200.

The one or more movement sensor(s) 600 can include any type of sensor(s) for measuring the movements of a subject, or for providing measurements representative of the movements of a subject. For example, the movement sensor(s) 600 can include any one or more of an accelerometer, a magnetometer, a satellite positioning system receiver (e.g. a GPS receiver, a GLONASS receiver, a Galileo positioning system receiver), a gyroscope, and an air pressure sensor (that can provide measurements indicative of the altitude of the subject or changes in height/altitude of the subject).

The one or more environment sensor(s) 800 can include any type of sensor(s) for monitoring an aspect of an environment or an aspect of an object in an environment. For example, the environment sensor(s) 800 can include one or more sensors 800 for detecting whether the subject is using an item of furniture, one or more sensors 800 for measuring or detecting whether the subject is using a wheelchair, one or more sensors 800 for measuring whether the subject is in a particular room, and/or one or more sensors 800 for measuring whether an object in the environment is being used. The environment sensor(s) 800 may be or include any one or more of an accelerometer, a gyroscope, a PIR sensor, an US sensor, a radar-based sensor, a light-based sensor, a radio frequency (RF) signal-based sensor (e.g. using Wi-Fi, Bluetooth, ZigBee, etc.) from which signal strength measurements can be obtained, an NFC sensor, a pressure sensor (i.e. for detecting pressure or force applied to part of an object), a camera, etc.

In some embodiments, in addition to or instead of the movement sensor(s) 600, one or more physiological characteristic sensors can be provided for monitoring or measuring physiological characteristics of the subject, and these physiological characteristic measurements can be evaluated as part of an emergency detection algorithm(s) for a fall and/or any other type of incident. For example, physiological characteristics such as heart rate, skin conductivity, breathing rate, blood pressure and/or body temperature can vary following a fall, and therefore an evaluation of these measurements can provide useful information for determining whether a subject has suffered a CVA. The one or more physiological characteristic sensors can include a photoplethysmograph (PPG) sensor that can measure heart rate, heart rate-related characteristics and breathing rate, a skin conductivity sensor, blood pressure monitor, thermometer, etc.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A wrist-worn emergency-detection device, such as a fall-detection device, the emergency detection device comprising a sensor interface, a processor and a touch-sensitive display, wherein the processor is arranged to:
   trigger an alarm based on an emergency-detection input from the sensor interface;
   select a cancel configuration of the device to accept a cancel alarm input from a user, the cancel alarm input instructing alarm cancellation with an input that varies from a previous time a cancel configuration was selected;
   format the display with user instructions according to the cancel configuration; and
   cancel the alarm when there is a cancel alarm input by the user in accordance with the user instructions.

2. A device according to claim 1, wherein the input variation is in one or more of: a sequence of inputs; an input position on the display; a swipe movement; a hand movement, a voice control and a period of activation time.

3. A device according to claim 2, wherein the processor is arranged to:
   select between different available configuration types to vary the input, wherein each different configuration type has a different display format template and requires a different cancel alarm input.

4. A device according to claim 1, wherein the processor is arranged to:
   configure the device with a cancel configuration that differs from a predefined number of most recent configurations.

5. A device according to claim 1, wherein the processor is arranged to:
   provide a cancel configuration with a shorter user response time when the chances of an emergency are higher.

6. A device according to claim 1, wherein the processor is arranged to:
   trigger the alarm if a threshold value of an emergency-detection algorithm based on the input from the sensor is exceeded; and
   provide a cancel configuration having a shorter response time when the threshold value is exceeded by a greater margin and to provide a cancel configuration having a longer response time when the threshold value is exceeded by a smaller margin.

7. A device according to claim 1, wherein cancel configurations available for selection include a two-stage configuration type with a first-stage configuration to accept a cancel alarm input followed by a second-stage configuration to accept confirmation of the cancellation.

8. A device according to claim 7, wherein an input variation within the two-stage configuration type includes a change in the display layout in the first stage configuration and/or the second stage configuration.

9. A device according to claim 1, wherein cancel configurations available for selection include a two-component configuration type with a two-component configuration requiring two different input components from the user at the same time to accept a cancel alarm input.

10. A device according to claim 9, wherein an input variation within the two-component configuration type includes a different timing requirement for one or both components.

11. A device according to claim 1, wherein cancel configurations available for selection include one or more of:
    a single-button configuration type with a display format template including a single cancel button to cancel the alarm;
    a slide-line configuration type with a display format template including a line for the user to slide a finger along to cancel the alarm;
    a timed-button configuration type with a display format template including a timed cancel button to cancel the alarm; and
    a plural-button configuration with a display format template including more than one button which must be activated in a predefined order.

12. A device according to claim 11, wherein
    in the single-button configuration type, an input variation within the configuration type varies the position of the button;
    in the slide-line configuration type, an input variation within the configuration type varies the position and/or shape of the line;
    in the timed-button configuration type, an input variation within the configuration type varies the length of time that button must be pushed; and
    in the plural-button configuration type, an input variation within the configuration type varies the positions of the buttons.

13. A device according to claim 7, wherein the input variation is provided by changing the configuration type or varying the input within the same configuration type.

14. A method carried out by a wrist-worn emergency detection device with a sensor interface, a processor and a touch-sensitive display, the method comprising:
    triggering an alarm based on an emergency-detection input;
    selecting a cancel configuration of the device to accept a cancel alarm input from a user allowing alarm cancellation with an input that varies from a previous time a cancel configuration was selected;

formatting the display with user instructions according to the cancel configuration; and cancelling the alarm when there is a cancel alarm input by the user in accordance with the user instructions.

15. A non-transitory computer program enabling the processor of a wrist-worn detection device to carry out the method of claim 14.

\* \* \* \* \*